(12) United States Patent
Tsutada et al.

(10) Patent No.: US 7,095,139 B2
(45) Date of Patent: Aug. 22, 2006

(54) TRANSFORMER INRUSH CURRENT ELIMINATION SYSTEM

(75) Inventors: Hiroyuki Tsutada, Tokyo (JP); Takashi Hirai, Tokyo (JP); Haruhiko Kohyama, Tokyo (JP); Hiroki Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 444 days.

(21) Appl. No.: 10/728,978

(22) Filed: Dec. 8, 2003

(65) Prior Publication Data

US 2004/0124814 A1    Jul. 1, 2004

(30) Foreign Application Priority Data

Dec. 25, 2002    (JP) .............................. 2002-373678

(51) Int. Cl.
*H01H 83/00*    (2006.01)
*G05F 1/70*    (2006.01)

(52) U.S. Cl. ........................ 307/129; 307/129; 323/209
(58) Field of Classification Search ................ 307/129; 323/209
See application file for complete search history.

(56) References Cited

U.S. PATENT DOCUMENTS 2,551,022 A * 5/1951 Lerstrup ...................... 361/110
6,392,390 B1 * 5/2002 Ito et al. ...................... 323/209

FOREIGN PATENT DOCUMENTS

JP    2-179220    7/1990
JP    11-345546    12/1999

OTHER PUBLICATIONS

John H. Brunke, "Elimination of Transformer Inrush Currents by Controlled Switching-Part II: Application and Performance Considerations", IEEE Transactions on Power Delivery, Apr. 2001, vol., 16, No. 2, pp. 281-285.
J. Brunke, "Elimination of Transformer Inrush Currents by Controlled Switching-Part I: Theoretical Considerations," *IEEE Transactions on Power Delivery*, Apr. 2001, vol. 16(2).

* cited by examiner

*Primary Examiner*—Lynn Feild
*Assistant Examiner*—Michael Rutland-Wallis
(74) *Attorney, Agent, or Firm*—Leydig, Voit & Mayer, Ltd.

(57) ABSTRACT

A closing phase that produces the smallest energization flux error at a connection input point is calculated based upon a residual flux of the first closing phase and the preliminarily given pre-arc characteristic and closing time deviation characteristic of a three-phase circuit breaker, so that the calculated phase value is set as a target closing phase of the first closing phase. A closing phase that produces the smallest energization flux error when a residual flux of zero is calculated, so that the calculated phase value is set as a target closing phase of the remaining two phases. The total time required from the reference point to the target closing phases of the remaining two phases and a delay time corresponding to an integer multiple of a given cycle of the three-phase power supply is set as a target closing time of the remaining two phases.

6 Claims, 7 Drawing Sheets

TRANSFORMER INRUSH CURRENT ELIMINATION SYSTEM

BACKGROUND OF THE INVENTION

1. Field of the Invention

The present invention generally relates to a transformer inrush current elimination technique for suppressing an inrush current generated upon connecting a transformer to a three-phase power supply, and more particularly, to an inrush current elimination technique using a controlled closing method for suppressing an inrush current transited in a three-phase transformer having a primary winding of a star connection type with a grounding neutral and a secondary or tertiary winding of a triangle connection type.

2. Description of the Prior Art

Conventionally, in, order for eliminating an inrush current in a transformer, there has been taught, for example, a controlled closing method using a circuit breaker connected in a specific phase of a three-phase power supply. The following description relates to a transformer inrush current elimination system of a controlled closing method.

In a conventional transformer inrush current elimination system using this method, a step-down means for lowering a phase voltage of a three-phase transformer is used so that the phase voltage is made suitable for an input signal of an optimum making (or energization) phase calculation device serving as an electronic equipment. That is, the step-down means lowers a phase voltage of each phase, which is generated upon de-energization (i.e., shut-down) of the three-phase transformer from the power supply and changes in a transient manner to finally become zero. By using these three step-down phase voltages as the input signals of the optimum making phase calculation device, the input voltages are subjected to a time-wise integrating operation by a residual flux calculation means to thereby calculate a residual flux inside an core of the three-phase transformer. Then, a making phase calculation means calculates three optimum making phases that are respectively different without causing an inrush current, by using a formula derived from a relational expression among a flux at the time of the making (energization), a making phase and the calculated residual flux. These calculation results are used as output signals of the optimum making phase calculation device, and thus, the output signals are used as making phase signals of a controlled switching unit of a circuit breaker. The making phase signals are individually inputted for the respective phases in the circuit breaker. See, for example, Patent Document 1. Japanese Patent No. 2685574 (Specification pages 4–10, FIGS. 1 to 10).

Moreover, in another conventional transformer inrush current elimination system of this type, the disclosure takes into consideration in practical use, regarding the points of mechanical closing time deviations of the circuit breaker, influences of pre-arc of the circuit breaker, and the like. See, for example, Non-Patent Document 1: "Elimination of Transformer Inrush Current by Controlled Switching" (IEEE TRANSACTIONS ON POWER DELIVERY) written by John. H. Brunke and Klaus. J. Frohlich), (U.S.) p. 276–285, Second Issue, Vol. 16, April 2001.

However, in the conventional techniques described in Patent Document 1, no consideration is given to mechanical closing time deviations and influences of pre-arc of the circuit breaker. Therefore, the phase input is sometimes carried out at a point offset from an optimum making phase, and in such a case, there has been a problem that an excessive inrush current tends to occur.

In addition, with respect to the optimum making phases of the rest two phases after the first phase has been inputted, the disclosure of Patent Document 1 takes no consideration of damping of DC flux components of a transformer core, which is caused by a triangle connection of a secondary or tertiary winding. Therefore, the optimum making phases of the rest two phases are not appropriate, resulting in occurrence of an excessive inrush current.

Moreover, in the conventional technique described in Non-Patent Document 2, there is no concrete description of a specific solution for solving a problem of mechanical closing time deviations and influences of pre-arc in the circuit breaker.

SUMMARY OF THE INVENTION

The present invention has been devised to solve the above-mentioned conventional problems, and its objective is to provide a transformer inrush current elimination system which suppresses the maximum value of an inrush current to prevent a generation of an excessive inrush current.

According to a first aspect of the present invention, a transformer inrush current elimination system for suppressing an inrush current that is generated as a transition current when a three-phase transformer is connected to a three-phase power supply via a three-phase circuit breaker, includes: source voltage measuring means adapted to measure a source voltage of any one phase to be used as a standard phase among three-phases; and transformer voltage measuring means adapted to measure a transformer voltage of each of the three-phases. The system further includes a residual flux calculating portion adapted to calculate a residual flux of each phase using the transformer voltage of each phase measured by the transformer voltage measuring means before and after a opening command input time. The system further includes a closing order determining portion adapted to determine a phase having the greatest absolute value of the residual flux calculated by the residual flux calculating portion, to be a first closing phase among the three-phases; a target closing phase determining portion adapted to determine target closing phases of the three closing phases.

In this construction, regarding the first closing phase, the target closing phase determining portion calculates a closing phase having the smallest value of an energization flux error that is an absolute value of the maximum error between a constant flux value and a residual flux value at a connection input point, based upon the residual flux of the first closing phase, and a preliminarily given pre-arc characteristic and closing time deviation characteristic of the three-phase circuit breaker, by using a 0 degree phase of the standard phase as a reference point, and sets the resultant calculated closing phase to be a target closing phase of the first closing phase. Regarding the rest two phases, the target closing phase determining portion calculates a closing phase having the smallest value of the energization flux error in the case of the residual flux being 0, based upon the preliminarily given pre-arc characteristic and closing time deviation characteristic of the three-phase circuit breaker, by using the 0 degree phase of the standard phase as a reference point, and sets the resultant calculated closing phase to be a target closing phase of each of the rest two phases.

The system further includes a target closing time determining portion adapted to calculate a time required from the reference point to the target closing phase of the first closing phase so that the calculated time is determined to be a target closing time of the first closing phase, and calculate a sum of the time required from the reference point to the target closing phases of the rest two phases and a delay time corresponding to an integral multiple of a predetermined cycle of the three-phase power supply so that the calculated sum is determined to be a target closing time of each of the rest two phases.

The system further includes a controlled closing portion which, upon receipt of a closing command, outputs a controlled closing signal to the three-phase circuit breaker so that each phase is contact-closed at the target closing time of each phase calculated by said target closing time determining portion, by using the 0 degree phase of the source voltage of the standard phase inputted from the source voltage measuring means as a reference point. In this construction, the three-phase transformer has a primary winding having a star connection with a neutral ground and a secondary or tertiary winding having a triangle connection, and the three-phase circuit breaker connects the three-phase transformer to the three-phase power supply by the closing and disconnects the transformer from the three-phase power supply by the opening.

According to a second aspect of the present invention, a transformer inrush current elimination system includes: source voltage measuring means adapted to measure a source voltage of any one phase to be used as a standard phase among three-phases; and transformer voltage measuring means adapted to measure a transformer voltage of the standard phase.

The system further includes a controlled opening portion which, upon receipt of a opening command, simultaneously outputs controlled opening signals to the rest two phases other than the standard phase, and after a predetermined time lapse therefrom, which outputs a controlled opening signal to the standard phase.

The system further includes a residual flux calculating portion adapted to calculate a residual flux of the standard phase using the transformer voltage of the standard phase measured by the transformer voltage measuring means before and after a opening command input time.

The system further includes a target closing phase determining portion adapted to determine target closing phases of the three closing phases, wherein, regarding the standard phase, said target closing phase determining portion calculates a closing phase having the smallest value of an energization flux error that is an absolute value of the maximum error between a constant flux value and a residual flux value at a connection input point, based upon the residual flux of the standard phase, and a preliminarily given pre-arc characteristic and closing time deviation characteristic of the three-phase circuit breaker, by using a 0 degree phase of the standard phase as a reference point, and sets the resultant calculated closing phase to be a target closing phase of the standard phase, and wherein, regarding the rest two phases, the target closing phase determining portion calculates a closing phase having the smallest value of the energization flux error in the case of the residual flux being 0, based upon the preliminarily given pre-arc characteristic and closing time deviation characteristic of the three-phase circuit breaker, by using the 0 degree phase of the standard phase as a reference point, and sets the resultant calculated closing phase to be a target closing phase of each of the rest two phases.

The system further includes a target closing time determining portion adapted to calculate a time required from the reference point to the target closing phase of the standard phase so that the calculated time is determined to be a target closing time of the standard phase, and calculate a sum of the time required from the reference point to the target closing phases of the rest two phases and a delay time corresponding to an integral multiple of a predetermined cycle of the three-phase power supply so that the calculated sum is determined to be a target closing time of each of the rest two phases.

The system further includes a controlled closing portion which, upon receipt of a closing command, outputs a controlled closing signal to the three-phase circuit breaker so that each phase is contact-closed at the target closing time of each phase calculated by the target closing time determining portion, by using the 0 degree phase of the source voltage of the standard phase inputted from the source voltage measuring means as a reference point. In this construction, the three-phase transformer has a primary winding having a star connection with a neutral ground and a secondary or tertiary winding having a triangle connection, and the three-phase circuit breaker connects the three-phase transformer to the three-phase power supply by the closing and disconnects the transformer from the three-phase power supply by the opening.

According to a third aspect of the present invention, a transformer inrush current elimination system includes: source voltage measuring means adapted to measure a source voltage of any one phase to be used as a standard phase among three-phases; and transformer voltage measuring means adapted to measure a transformer voltage of each of the three-phases.

The system further includes a residual flux calculating portion adapted to calculate a residual flux of each phase using the transformer voltage of each phase measured by the transformer voltage measuring means before and after a opening command input time.

The system further includes a closing order determining portion adapted to determine a closing order of the three-phases, wherein, regarding each of the three-phases, the closing order determining portion calculates a minimum energization flux error and a closing phase having the smallest value of the energization flux error that is an absolute value of the maximum error between a constant flux value and a residual flux value at a connection input point, based upon the calculated residual flux, and a preliminarily given pre-arc characteristic and closing time deviation characteristic of the three-phase circuit breaker, by using a 0 degree phase of the standard phase as a reference point, and sets the resultant calculated closing phase having the smallest minimum energization flux error to be a first closing phase among the three-phases.

The system further includes a target closing phase determining portion adapted to determine target closing phases of the three-phases, wherein, regarding the first closing phase, the target closing phase determining portion calculates a closing phase having the smallest value of the energization flux error of the first closing phase calculated by the closing order determining portion, and sets the resultant calculated closing phase to be a target closing phase of the first closing phase, and wherein, regarding the rest two phases, the target closing phase determining portion calculates a closing phase having the smallest value of the energization flux error in the case of the residual flux being 0, based upon the preliminarily given pre-arc characteristic and closing time deviation characteristic of the three-phase circuit breaker, by using the 0 degree phase of the standard phase as a reference point, and sets the resultant calculated closing phase to be a target closing phase of each of the rest two phases.

The system further includes a target closing time determining portion adapted to calculate a time required from the reference point to the target closing phase of the first closing phase so that the calculated time is determined to be a target closing time of the first closing phase, and calculate a sum of the time required from the reference point to the target closing phases of the rest two phases and a delay time corresponding to an integral multiple of a predetermined cycle of the three-phase power supply so that the calculated sum value is determined to be a target closing time of each of the rest two phases.

The system further includes a controlled closing portion which, upon receipt of a closing command, outputs a controlled closing signal to the three-phase circuit breaker so that each phase is contact-closed at the target closing time of each phase calculated by said target closing time determining portion, by using the 0 degree phase of the source voltage of the standard phase inputted from the source voltage measuring means as a reference point. In this construction, the three-phase transformer has a primary winding having a star connection with a neutral ground and a secondary or tertiary winding having a triangle connection, and the three-phase circuit breaker connects the three-phase transformer to the three-phase power supply by the closing and disconnects the transformer from the three-phase power supply by the opening.

BRIEF DESCRIPTION OF THE DRAWINGS

These and other objects and features of the present invention will be readily understood from the following detailed description taken in conjunction with preferred embodiments thereof with reference to the accompanying drawings, in which:.

DETAILED DESCRIPTION OF THE PREFERRED EMBODIMENTS

Figure 1:
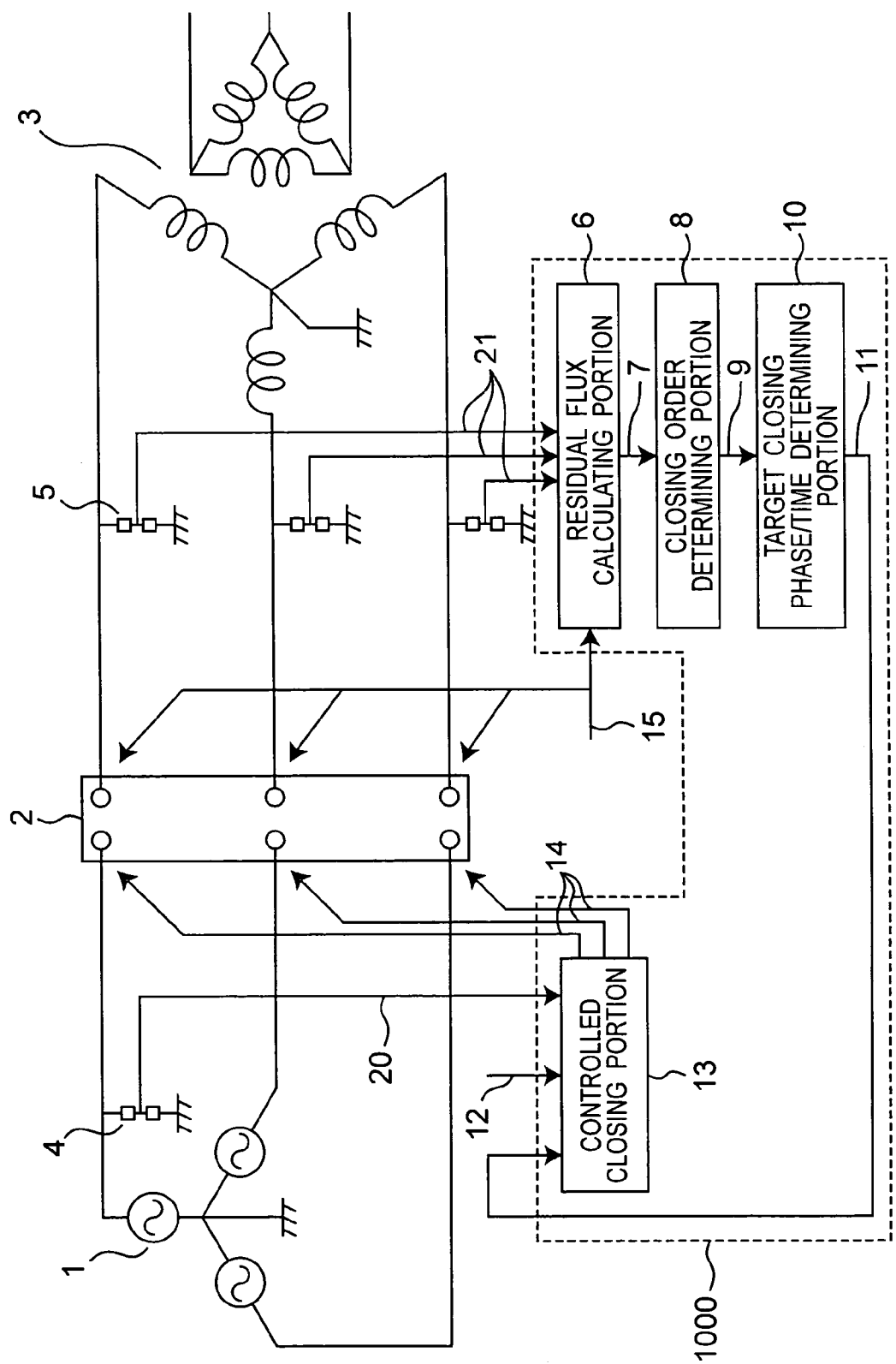
FIG. 1 is a drawing that explains a transformer inrush current elimination equipment in accordance with an embodiment 1 of the present invention.

Before the description proceeds, it is to be noted that, since the basic structures of the preferred embodiments are in common, like parts are designated by the same reference numerals throughout the accompanying drawings.

Embodiment 1

Figure 2:
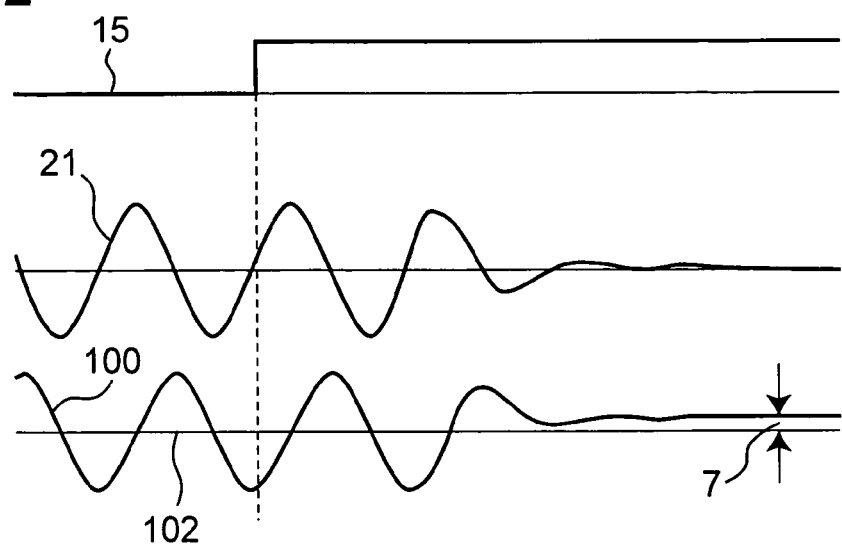
FIG. 2 is a drawing that explains the transformer inrush current elimination equipment in accordance with the embodiment 1 of the present invention.
Figure 3:
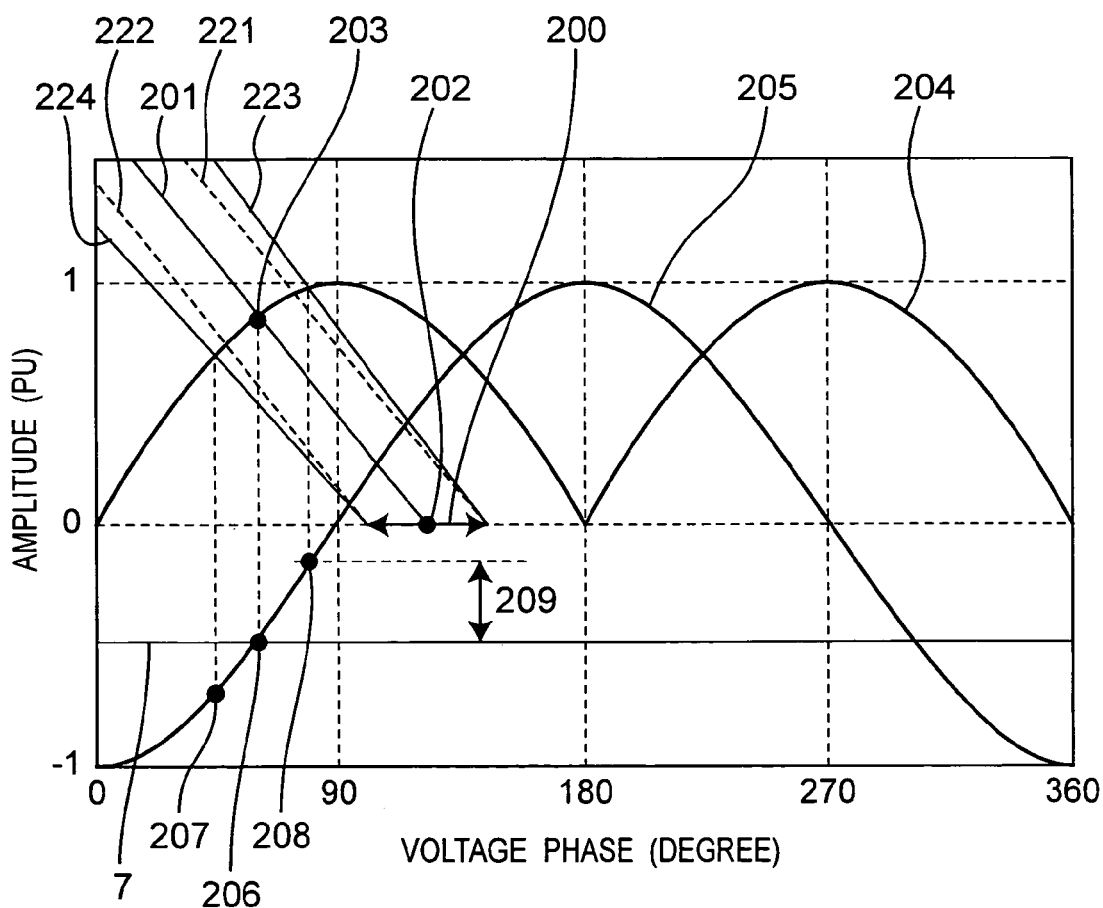
FIG. 3 is a drawing that explains the transformer inrush current elimination equipment in accordance with the embodiment 1 of the present invention.
Figure 4:
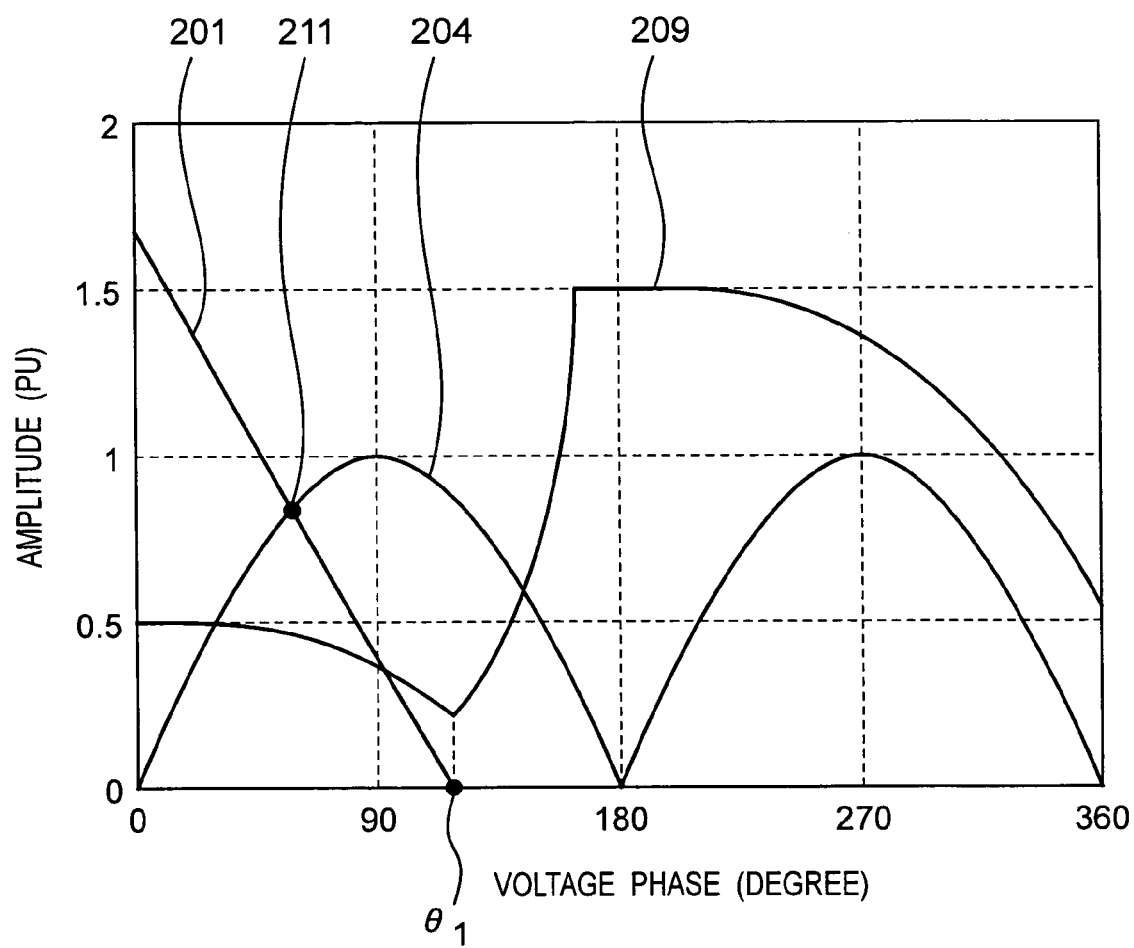
FIG. 4 is a drawing that explains the transformer inrush current elimination equipment in accordance with the embodiment 1 of the present invention.

FIGS. 1 to 4 are drawings for explaining an embodiment 1 of a transformer inrush current elimination system (hereinafter, briefly referred to as "inrush current elimination system" or simply "inrush current elimination system" by omitting "transformer"). More specifically, FIG. 1 is a block diagram showing a main construction of an inrush current elimination system including a three-phase transformer, a three-phase circuit breaker together with showing signals and data flows. FIG. 2 is a timing chart showing a relationship among a opening command signal, a transformer voltage and a flux signal. FIG. 3 shows phase characteristics for explaining an error in an applied flux. FIG. 4 is a characteristic diagram showing one example of an applied-flux error in each contact-close phase (voltage phase).

A three-phase transformer 3 includes a primary winding having a star connection structure and a secondary or tertiary winding having a triangle connection structure, where an core is omitted from the drawing. The primary winding is connected to a three-phase power supply 1 through a three-phase circuit breaker 2 so that connection of the three-phase transformer 3 to the three-phase power supply 1 and shut-down thereof from the three-phase power supply 1 are both controlled by closing/opening operations of the three-phase circuit breaker 2.

In the present embodiment, when the three-phase transformer 3 is shut-down from the three-phase power supply 1, main contacts for the three-phases are simultaneously operated in the three-phase circuit breaker 2 so that all the three-phase contacts are opened at the same time, in the same manner as a normal three-phase breaker. Meanwhile, when the three-phase transformer 3 is applied to be connected to the three-phase power supply 1, a controlled switching for each phase is conducted by the three-phase breaker such that the three-phase contacts are separately closed based upon separate-controlled closing phases.

In the present embodiment, it is noted that any one of the phases of the three-phase power supply 1 is defined as a standard phase.

The source voltage 20 of the standard phase is measured by a source voltage measuring means such as a voltmeter 4, and is inputted to a controlled closing portion 13. The transformer voltage 21 of each phase, that is, the phase voltage on the primary winding side of the three-phase transformer 3, is measured by a transformer voltage measuring means such as a voltmeter 5, and is inputted to a residual flux calculating portion 6 of a controller 1000. Here, the source voltage measuring means 4 and the transformer voltage measuring means 5 may be implemented by a general potential transformer (PT) for high-voltage measurement.

The controller 1000, which is constituted, for example, on the basis of microcomputers, includes the residual flux calculating portion 6, a closing order determining portion 8, a target closing phase/time determining portion 10 and the controlled closing portion 13.

As will be explained in detail later, upon receipt of an opening command 15, the residual flux calculating portion 6 calculates a residual flux 7 of each phase from the transformer voltage 21 of each phase before and after the input time of the opening command 15. That is, the residual flux 7 of each phase in the core of the three-phase transformer 3 is calculated.

The closing order determining portion 8 determines the closing order 9 of each phase of the three-phase circuit breaker 2. In the present embodiment, the phase that has the greatest absolute value of the residual flux 7 calculated by the residual flux calculating portion 6 is defined as a first closing phase of the respective three-phases.

The target closing phase/time determining portion 10 calculates the target closing time 11 of each phase based upon a 0 (zero) degree phase of the source voltage 20 of the standard phase. In other words, as will be described in detail later, regarding the first closing phase determined by the closing order determining portion 8, by using 0 degree phase of the standard phase as a reference point, a closing phase is calculated, based upon the residual flux of the first closing phase and the pre-arc characteristic and closing time deviation characteristic of the three-phase circuit breaker 2 that have been preliminarily obtained. The calculation of the closing phase is performed in a manner such that the calculated closing phase makes smallest the applied-flux error which corresponds to the absolute value of the greatest error between a constant flux value and a residual flux value at the application point. Thus, the calculated closing phase is set as a target closing phase of the first closing phase. Then, the time required from the reference point to the target closing phase of the first closing phase is set as a target closing time of the first closing phase.

Moreover, regarding the rest two phases, by using 0 degree phase of the standard phase as a reference point, based upon the pre-arc characteristic and closing time deviation characteristic of the three-phase circuit breaker 2 that have been preliminarily obtained, a closing phase is calculated so as to make smallest the applied-flux error in the case of the residual flux being 0. Thus, the calculated closing phase is set as the target closing phase of each of the rest two phases. Then, the sum of the time required from the reference point to the target closing phase of each of the rest two phases and a delay time corresponding to an integral multiple of a frequency of the three-phase power supply 1 that has been preliminarily set is defined as a target closing time of each of the rest two phases.

As will be explained in detail later, upon receipt of a closing command 12, the controlled closing portion 13 outputs controlled closing signals 14 to the three-phase circuit breaker 2 so that, using 0 degree phase of the source voltage 20 of the standard phase inputted from the source voltage measuring means 4 as a reference point, each phase is contact-closed at the target closing time 11 of each phase calculated by the target closing phase/time determining portion 10.

Referring to FIG. 2, the following describes an operation of the residual flux calculating portion 6. When it is necessary to shut-down the three-phase transformer 3 from the three-phase power-supply 1 by operating the three-phase current breaker 2, a opening command signal 15 is inputted externally to the residual flux calculating portion 6. This opening command 15 acts as a signal that directly carries out a shut-down operation on the three-phase circuit breaker 2 in the same manner as a normal operation, and also acts as an input signal to the residual flux calculating portion 6 to be used as a starting command for the residual flux calculation of the three-phase transformer 3.

Upon receipt of the opening command 15, the circuit breaker 2 opens the contacts after a lapse of a mechanical operating time of the three-phase circuit breaker 2. As shown in FIG. 2, after the opening, the transformer voltage 21 is converged with damping vibration to finally become zero. Here, the residual flux calculating portion 6 calculates a flux signal 100 by integrating the transformer voltage 21 measured by the transformer voltage measuring means 5 for each phase. Then, there is given a residual flux 7 as a difference between the flux value (100) at the time when the transformer voltage 21 is conversed to zero after the input of the opening command 15, and the center value 102 of the flux signal prior to the input of the opening command 15. The residual flux 7 for each phase is outputted from the residual flux calculating portion 6.

As described above, the residual flux calculating portion 6 calculates the residual flux 7 by using transformer voltages 21 before and after the input of the opening command 15. Therefore, for example, at the time when the three-phase transformer 3 is connected to the three-phase power supply 1, the transformer voltage measuring portion 5 starts the measurement of the transformer voltage 21 of each phase, and then the measuring process is stopped after a predetermined time lapse (at least a time required for the transformer voltage 21 to be converged to zero) from the time of inputting the opening command 15. Moreover, the residual flux calculating portion 6 is arranged so that the transformer voltage 21 of each phase is stored up to a predetermined elapsed period of time prior to the input of the opening command 15 wherein the elapsed time period is set to such a degree that the center value 102 of the flux signal 100 can be obtained, for example, a time period corresponding to one cycle of the three-phase power supply, and that the storing process is stopped at the time the time when the transformer voltage 21 is converged to zero, after a predetermined time lapse from the input of the opening command 15. In this manner, the transformer voltages 21 before and after the input of the opening command 15 are obtained.

Alternatively, any other structure may be used as long as the center value 102 of the flux signal 100 before the opening can be calculated and as long as the transformer voltage 21 up to the time of converging the transformer voltage 21 to zero is obtained. For example, another arrangement may be used in which, by stopping the above-mentioned measurements and storing process after a lapse of predetermined time from the time at which an auxiliary contact of the three-phase circuit breaker 2 is opened in place of the input of the opening command 15, the transformer voltages 21 before and after the input of the opening command 15 is obtained. Alternatively, by stopping the above-mentioned measurements and storing process at the time when the effective value of the transformer voltage 21 has become zero or reached a predetermined value or less instead of inputting the opening command 15, the transformer voltages 21 before and after the input of the opening command 15 can be obtained.

Next, the following description will explain the target closing phase/time determining means 10 in detail.

(1) Concerning determination of the target closing phase and the target closing time of the first closing phase:

First, the characteristics of the three-phase circuit breaker 2 are explained.

When a controlled closing signal 14 is outputted from the controlled closing portion 13, the contacts of the three-phase circuit breaker 2 are closed by mechanical contact touch after a lapse of certain mechanical operating time. It is noted that the moment at which the contacts are mechanically made in contact is referred to as "closing", and the time period from generation of the controlled closing signal to the closing is referred to as "closing time". Moreover, it is known that main circuit current starts to flow due to a preceding discharge prior to closing. It is noted that, the preceding discharge is referred to as "pre-arc", and the operation at the moment of starting the main circuit current to flow is referred to as "energization" or "making". Further, the time required from the output of the controlled closing signal 14 to the "making", is referred to as "making time".

The moment of the input depends on the absolute value of an interpole voltage that is a voltage to be applied between the contacts of the three-phase circuit breaker 2. Since the transformer voltage 21 is zero at the time of inputting the first phase, the interpole voltage is equal to the source voltage 20.

A dielectric withstand line 201, shown in FIG. 3, indicates a voltage resistance value between the contacts at a certain time in the circuit breaker closed at a time 202. In the case where, at a certain time, the absolute value 204 of the interpole voltage is lower than the voltage resistance value (201), the input is not carried out since the voltage resistance between the contacts is greater. However, at a point 203 in FIG. 3 that is an intersection between the dielectric withstand line 201 and the absolute value 204 of the interpole voltage, a pre-arc is generated so that the input is carried out, since the voltage resistance between the contacts becomes lower than the absolute value 204 of the interpole voltage at this point. Consequently, when determining the target closing phase, it is necessary to take the pre-arc characteristic into consideration. Hereinafter, the intersection between the dielectric withstand line 201 and the absolute value of the interpole voltage 204 is referred to as "input point".

In order to reduce an inrush current generated upon connection of the three-phase transformer 3, the circuit breaker should be inputted at a moment when a constant flux 205 corresponding to a flux generated in a constant state by the input of the source voltage 20 is coincident with the residual flux 7. Consequently, in the case of the residual flux 7 shown in FIG. 3, having the contacts to be closed at point 202, the input is made at a point 206 in which the constant flux 205 and the residual flux 7 are made coincident with each other.

However, since the three-phase circuit breaker 2 has deviations in the closing time having a normal distribution caused by mechanical operational deviations thereof, the input is not necessarily carried out at the target closing phase. In FIG. 3, broken lines 221 and 222 show a variation range of the dielectric withstand line 201 in the case of the closing time deviation 200 being ±1 msec.

Moreover, since the three-phase circuit breaker 2 has electrical deviation in discharge between the contacts, the dielectric withstand line 201 has predetermined deviations. In FIG. 3, solid lines 223 and 224 show a variation range of the dielectric withstand line 201 in the case where the value of the dielectric withstand line 201 has deviations of ±10%. When these deviations are taken into consideration, in the example shown in FIG. 3, the input is made at any of the phases located within a range from a point 207 to a point 208. The absolute value of the greatest error between the residual flux 7 and the normal flux 205 at the input point at this time is defined as an energization flux error 209.

In other words, the transformer flux in a constant state after the input of the three-phase circuit breaker 3 is defined as a constant flux, an energization flux error 209 can be defined by the absolute value of the greatest error between the constant flux value and the residual flux value at the input point that occurs due to deviations at the input point within a fixed range (from the point 206 to the point 208). Here, the fixed range is calculated by taking the pre-arc characteristic and closing time deviations of the three-phase circuit breaker 2 into consideration.

As the energization flux error 209 increases, the inrush current becomes greater, and therefore, in order to suppress the greatest value of the inrush current, a closing phase that makes the energization flux error smallest in accordance with the residual flux 7 may be set as the target closing phase.

The following describes one example of a method of obtaining the target closing phase corresponding to the residual flux 7 by taking into consideration of the circuit breaker characteristics (i.e., pre-arc characteristics and closing time deviation characteristics of the three-phase circuit breaker 2).

When the amplitude of the flux of the three-phase transformer 3 at the time of applying a normal voltage is standardized by a rated value to 1PU (Per Unit), it is supposed that the residual flux of the first closing phase is defined as −0.5PU.

The closing phase $\theta_c$ is varied within a range of 0 degree to 360 degrees (for example, successively by one degree), and the energization flux error 209 is calculated when each voltage phase is set to the closing phase.

First, the following explains how to find the energization flux error.

Supposing that the closing time deviation of the three-phase circuit breaker 2 is ±1 msec and that the deviation of the inclination of the dielectric withstand line 201 is ±10%, a value, which satisfies the following inequality centered on the closing phase $\theta_c$,
($\theta_c$−1 msec)≤α≤($\theta_c$+1 msec), and also makes the absolute value, |constant flux value−residual flux value|, greatest, is found centered on the center value rc of the dielectric withstand line 201, within the following range:

$$r_c \times 0.9 \leq r \leq r_c \times 1.1.$$

More specifically, while the phase α and the inclination r of the dielectric withstand line 201 are varied in each fixed interval within the above-mentioned range, the intersection between the dielectric withstand line 201 and the absolute value 204 of the interpole voltage is obtained.

The source voltage $y_{p1}$ is defined as $y_{p1} = \sin \theta$, with the maximum amplitude of the voltage being set to 1PU.

Since the transformer voltage $y_{t1}$ is 0 ($y_{t1}=0$), the interpole voltage $y_{i1}$ is represented by $Y_{i1}=y_{p1}-y_{t1}=\sin \theta$, while the dielectric withstand line $y_w$ is represented by $y_w=r\times(\theta-\alpha)$.

The intersection is represented by θ that satisfies $|y_{i1}|=y_w$. In the case where there are a plurality of intersections, the intersection having the greatest absolute value of the voltage is used. Since the constant flux value $b_1$ at the intersection has a phase delay of 90 degrees from the source voltage, it is found from the following equation:

$$b_1 = \sin(\theta - 90°)$$

supposing that the maximum amplitude of the constant flux 205 is 1Pu.

By repeating this calculation within the above-mentioned ranges of α and r, the constant flux value is successively found. Among these calculation results, the maximum value of absolute value of |constant flux value−residual flux value|, represents an energization flux error at the closing phase $\theta_c$.

With respect to the value of closing time deviation in the three-phase circuit breaker 2, the inclination of the dielectric withstand light and the deviation (pre-arc characteristic) of the inclination of the dielectric withstand line, these values are preliminarily given by examining the characteristics of the three-phase circuit breaker 2 beforehand.

For example, when the point 202 is given as the closing phase, the point 203 represents an intersection between the dielectric withstand line 201 and the absolute value 204 of the interpole voltage, and the constant flux value is represented by a point 206. When this process is repeated with the closing time deviation and the deviation of the inclination of the dielectric withstand line, the range of the constant flux value is given as a range from the point 207 to the point 208. Since the residual flux value 7 corresponds to the point 206, the energization flux error corresponds to a segment 209.

FIG. 4 shows an example of an energization flux error obtained by repeating the above-mentioned processes in a range of 0 degree to 360 degrees of the closing phase $\theta_c$. In this case, since the energization flux error 209 is minimized at $\theta_1$ (degrees), the target closing phase is $\theta_1$. Therefore, the target closing time is set so as to make the contacts closed at $\theta_1$. Here, the controlling process is carried out so as to perform the input at a point 211.

Supposing that the phase difference between the first closing phase and the standard phase is P (degrees) with the frequency of the power supply being set to f (Hz), the target closing time $T_1$ (msec) of the first closing phase is given by the following equation:

$$T_1 = ((\theta_1 + P)/360) \times (1000/f)$$

using the 0 degree point of the standard phase as a reference point.

(2) Concerning determination of the target closing phase and the target closing time of the rest two phases:

After the input of the first closing phase, a voltage having a ½ amplitude with an inversed phase to the first closing phase is induced as the transformer voltage of each of the rest two phases, due to the triangle connection of the three-phase transformer 3. Moreover, DC components, which are caused by residual fluxes existing in the rest two phases, are damped due to the equalization phenomenon of the core flux, and the DC components become approximately zero when several cycles have elapsed after the input of the first closing phase. By preliminarily obtaining such a number of cycles that makes the DC components approximately zero through measured and predetermining the number, it becomes possible to ignore the influences of the residual flux after a lapse of a delay time corresponding to an integral multiple of the cycle of the three-phase power supply 1 that has been preliminarily set based on the above-mentioned reference point. By utilizing such a known characteristic, the target closing time of the rest two phases is given as a specific phase after a lapse of predetermined delay time K (msec) corresponding to an integral multiple of the cycle of the three-phase power supply that has been preliminarily set based on the above-mentioned reference point.

Source voltages $y_{p2}$, $y_{p3}$ of the rest two phases are respectively represented by:

$$y_{p2} = \sin(\theta - 120°), \text{ and}$$

$$y_{p3} = \sin(\theta - 240°).$$

Transformer voltages $y_{t2}$, $y_{t3}$ are respectively represented by:

$$y_{t2} = \sin(\theta - 180°)/2, \text{ and}$$

$$y_{t3} = \sin(\theta - 180°)/2.$$

Therefore, interpole voltages $y_{i2}$, $y_{i3}$ of the rest two phases are respectively represented by:

$$y_{i2} = y_{p2} - y_{t2} = (3^{1/2}/2) \times \sin(\theta - 90°)$$

$$y_{i3} = y_{p3} - y_{t3} = -(3^{1/2}/2) \times \sin(\theta - 90°)$$

In the same manner as the first closing phase, an intersection between the dielectric withstand line 201 and the absolute value 204 of the interpole voltage, that is, θ that satisfies the following equation, is found:

$$|y_{i2}| = |y_{i3}| = y_w$$

The constant flux values $b_2$, $b_3$ of the rest two phases are respectively found based upon the following equations:

$$b_2 = \sin(\theta - 120° - 90°)$$

$$b_3 = \sin(\theta - 240° - 90°).$$

Here, supposing that residual flux=0, the phase $\theta_2$ (degree) that makes the energization flux error smallest is found in the same manner as the first closing phase. Here, with respect to the rest two phases, the phase $\theta_2$ has the same value.

Supposing that the phase difference between the first closing phase and the standard phase is P (degree) and that the frequency of the power-supply is f(Hz), the target closing times $T_2$ (msec) and $T_3$ (msec) of the rest two phases, obtained when 0 degree point of the standard phase is used as a reference point, are found from the following equation:

$$T_2 = T_3 = K + ((\theta_2 + P)/360) \times (1000/f).$$

The present embodiment has exemplified a case in which the target closing phase/time determining portion 10, which includes a target closing phase determining means and a target closing time determining means in a combined manner, is installed; however, these target closing phase determining means and target closing time determining means may of course be prepared in a separate manner.

The following describes the operation of the controlled closing portion 13.

Upon receipt of a closing command 12, control signal output delays $D_1$ (msec), $D_2$ (msec) and $D_3$ (msec) for the respective phases are calculated through the following equations by using the target closing times $T_1$ (msec), $T_2$ (msec), $T_3$ (msec) obtained by the target closing phase/time determining portion 10 and predicted next closing times $E_1$ (msec), $E_2$ (msec), $E_3$ (msec) in the first closing, second closing and third closing phases. Here, $E_1$, $E_2$ and $E_3$ may be determined based upon the closing times of the respective phases of the three-phase circuit breaker 2, which have been preliminarily measured, or may be set by using closing times that have been predicted after carrying out compensations based upon control voltage, ambient temperature and operating pressure that are operation conditions for the three-phase circuit breaker 2.

Here, in the following equations, mod (A, B) corresponds to a remainder resulting from a division of A by B. Here, n represents a value that satisfies $D_1>0$, $D_2>0$ and $D_3>0$, while making $D_1$, $D_2$ and $D_3$ smallest. Further, * represents a symbol indicating a multiplication.

$$D_1 = 1000/f^*(n+1) - mod(E_1 - T_1, 1000/f)$$

$$D_2 = 1000/f^*n + D_1 + (T_2 - T_1) + (E_1 - E_2)$$

$$D_3 = 1000/f^*n + D_1 + (T_3 - T_1) + (E_1 - E_3)$$

A timer is started from the point of time at which the phase 0 degree point of the power-supply voltage 20 of the standard phase has been detected, and after lapses of $D_1$, $D_2$ and $D_3$ relating to the respective phases, the controlled closing signals 14 are respectively outputted. The detection of the phase 0 degree point of the power-supply voltage 20 of the standard phase may be carried out, for example, by finding a zero crossing point at which the value of the source voltage 20 changes from negative to positive.

In the above-mentioned description, a structural example of the controlled closing portion 13 has been shown. However, the main subject matter of the present invention is to contact-close each of the phases of the three-phase circuit breaker 2 after a lapse of each of the target closing times $T_1$, $T_2$ and $T_3$ (msec) of the respective phases obtained by the target closing phase/time determining portion 10, based on the phase 0 degree point of the source voltage 20 of the standard phase. Therefore, any structure included within the range of this main subject is not to be regarded as a departure from the spirit and scope of the present invention.

When the circuit breaker characteristics are taken into consideration, as the absolute value of the residual flux increases, the energization flux error at the target closing time tends to become smaller. Whereas, in the present embodiment, since the phase having the greatest absolute value of the residual flux among the respective phases is set to the first closing phase byn the closing order determining portion 8, it is possible to suppress the greatest value of the inrush current of the first closing phase.

Moreover, in the target closing phase/time determining portion 10, the target closing phase and time of each phase are determined based upon the pre-arc characteristic, the deviation characteristic of the closing time and the residual flux of the three-phase circuit breaker 2. Therefore, it becomes possible to suppress the greatest value of the inrush current.

Furthermore, in the target closing phase/time determining portion 10, the target closing times of the rest two phases (second and third closing phases) are determined by taking into consideration of the damping of the DC flux component in the transformer core after the input of the first phase. Therefore, it becomes possible to suppress the greatest values of the inrush currents of the second and third closing phases.

Thus, it becomes possible to prevent the generation of an excessive inrush current.

Here, the present embodiment has exemplified a case in which the residual flux calculating portion 6, the closing order determining portion 8, the target closing phase/time determining portion 10 and the controlled closing portion 13 are achieved by a software program or a software program and a memory that are packaged on a microcomputer of a single controller equipment 1000. However, the present invention is not limited to this structure, these portions may be controlled by respectively different control equipments. The same is true for the following embodiments.

Embodiment 2

Figure 5:
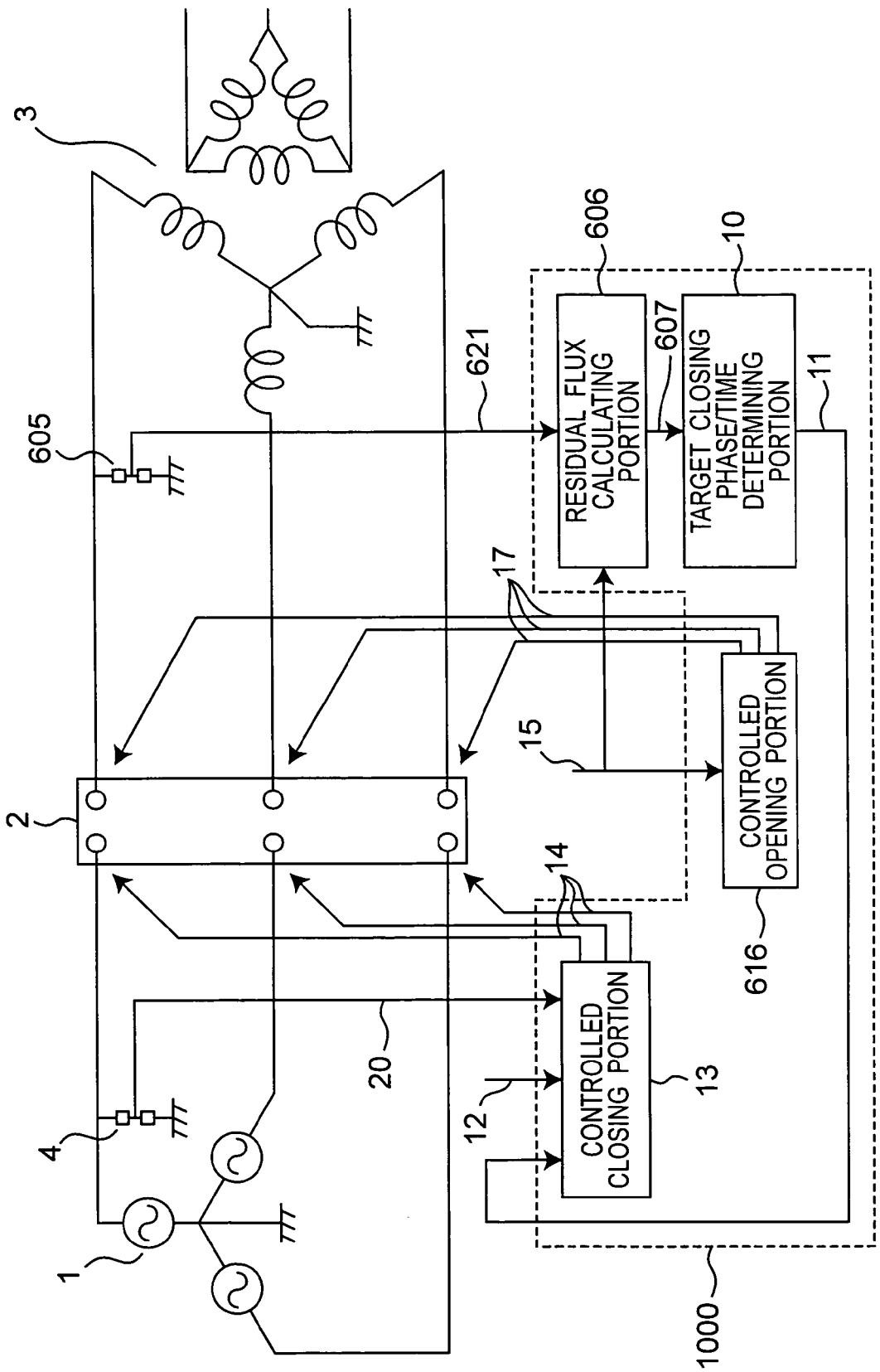
FIG. 5 is a drawing that explains a transformer inrush current elimination equipment in accordance with an embodiment 2 of the present invention.

FIG. 5 shows a transformer inrush current elimination system in accordance with an embodiment 2 of the present invention. More specifically, FIG. 5 is a circuit block diagram showing a structure of main portions of an inrush current elimination system which includes a three-phase transformer, a three-phase circuit breaker, together with flows of signals and data.

In this embodiment, a controlled opening portion 616 is added to the structure of the embodiment 1 shown in FIG. 1. The controlled opening portion 616 generates a circuit-controlled opening signal 17 for controlling the opening process of each phase of the three-phase circuit breaker 2. In the structure shown in FIG. 2, a transformer voltage 621 of the standard phase is measured by a transformer voltage measuring means 605, while a residual flux 607 of the standard phase is calculated by a residual flux calculating portion 606. Here, since the standard phase is used as the first closing phase, the closing order determining portion 8 shown in FIG. 1 is not necessary in this embodiment. The other structures are the same as those explained in the embodiment 1, and therefore, the following description will mainly explain the points different from those in the embodiment 1.

In the embodiment 2, the controller 1000 includes the controlled opening portion 616, residual flux calculating portion 606, target closing phase/time determining portion 10, and controlled closing portion 13.

First, the controlled opening portion 616 is explained.

Upon receipt of a opening command 15, the controlled opening portion 616 simultaneously outputs controlled opening signals to the two phases other than the standard phase (these two phases are referred to as "preceding opening two phases"), and then outputs a controlled opening signal to the standard phase after a predetermined time lapse P. Here, the time P is determined as a time period from a time point at which the controlled opening signal has been simultaneously outputted to the preceding opening two phases, to a time point at which the flux signals of the preceding opening two phases (to be described later) become approximately the same value and the amplitude in the reverse phase of the flux signal of the standard phase becomes ½ of the rated value, and this time period is preliminarily given. More specifically, for example, this time corresponds to approximately several times a period of the three-phase power supply 1.

When the preceding opening two phases have been openinged, due to the triangle connection of the three-phase transformer 3, a voltage having a ½ amplitude in the phase reversed to the standard phase is induced as the transformer voltage of the preceding opening two phases. Moreover, core flux values of the preceding opening two phases come closer to each other due to the equalization phenomenon of the core fluxes, and after a predetermined time lapse P, the flux signals become approximately the same value, with the amplitude being a ½ of the rated value in the phase reversed to the standard phase. When the standard phase is openinged in this state, since each of the flux peak values of the preceding opening two phases immediately before the opening is a ½ of the rated value, the residual flux of the preceding opening two phases becomes not more than ½. Moreover, since the core flux values of the opening preceding two phases immediately before the opening of the standard phase are approximately the same, the residual fluxes of the preceding opening two phases are converged to approximately the same value of the same sign. Since the total sum of the residual fluxes becomes 0 due to the triangle connection of the three-phase transformer 3, the residual flux of the standard phase can be set to a relatively great value with the sign reversed to that of the preceding opening two phases. That is, the absolute value thereof is approximately two times the residual flux of the preceding opening two phases.

Therefore, the standard phase can be set as the first closing phase in this embodiment without using the closing order determining portion 8, different from the construction of the embodiment 1.

The residual flux 607 of the standard phase that is the first closing phase calculated by the residual flux calculating portion 606 is inputted to the target closing phase/time determining portion 10. The target closing phase/time determining portion 10 determines the target closing phase and target closing time of each phase in the same manner as the embodiment 1. Therefore, the detailed explanation is omitted here.

For a brief explanation, regarding the first closing phase (standard phase), by using 0 degree phase of the standard phase as a reference point, based upon the residual flux of the first closing phase and the preliminarily given pre-arc characteristic and closing time deviation characteristic of the three-phase circuit breaker 2, a closing phase that makes the energization flux error smallest is calculated to be set as the target closing phase of the standard phase. Then, the time required from the reference point to the target closing phase of the standard phase is set as the target closing time of the standard phase.

Moreover, regarding the rest two phases (i.e., preceding opening two phases), by using 0 degree phase of the standard phase as a reference point, based upon the preliminary given pre-arc characteristic and closing time deviation characteristic of the three-phase circuit breaker 2, a closing phase that makes the energization flux error smallest in the case of the residual flux being 0 is calculated to be set as the target closing phase of the rest two phases. Then, the sum of the time required from the reference point to the target closing phase of the rest two phases and a predetermined delay time corresponding to an integral multiple of the cycle of the three-phase power supply is defined as the target closing time of the rest two phases.

In the same manner as the embodiment 1, upon receipt of a closing command 12, the controlled closing portion 13 outputs a controlled closing signal 14 to the three-phase circuit breaker 2 in a manner such that, using 0 degree phase of the source voltage 20 of the standard phase supplied from the source voltage measuring means 4 as a reference point, each phase is contact-closed at the target closing time of each phase calculated by the target closing phase/time determining portion 10.

As described above, in the present embodiment, by providing the controlled opening portion 616, upon receipt of a opening command 15, after a predetermined time lapse since the controlled opening signals are simultaneously outputted to the two phases (two preceding opening phases) other than the standard phase, a controlled opening signal is outputted to the standard phase. Therefore, the following effects are obtained in addition to the effects of the embodiment 1.

It is possible to make the residual flux values of the two phases other than the standard phase approximately equal to each other, and consequently it becomes possible to directly set the DC components of the fluxes of the rest two phases to be zero after the input of the standard phase. Thus, it becomes possible to minimize the delay time in the target closing time determining portion. By this arrangement, since the unbalanced state of the three-phase transformer 3 is reduced in time, the stress imposed on the three-phase transformer 3 is consequently minimized, and the delay due to the controlling process is also minimized.

Further, it is necessary to carry out measurements on the transformer voltage and calculations on the residual flux with respect to only one phase (i.e., standard phase). As a result, it is possible to reduce the number of instruments for measuring the transformer voltage to only one from three required in the embodiment 1. Moreover, the residual flux calculating portion 606 can be simplified in comparison with that of the embodiment 1. Furthermore, it is possible to omit the closing order determining portion 8.

Embodiment 3

Figure 6:
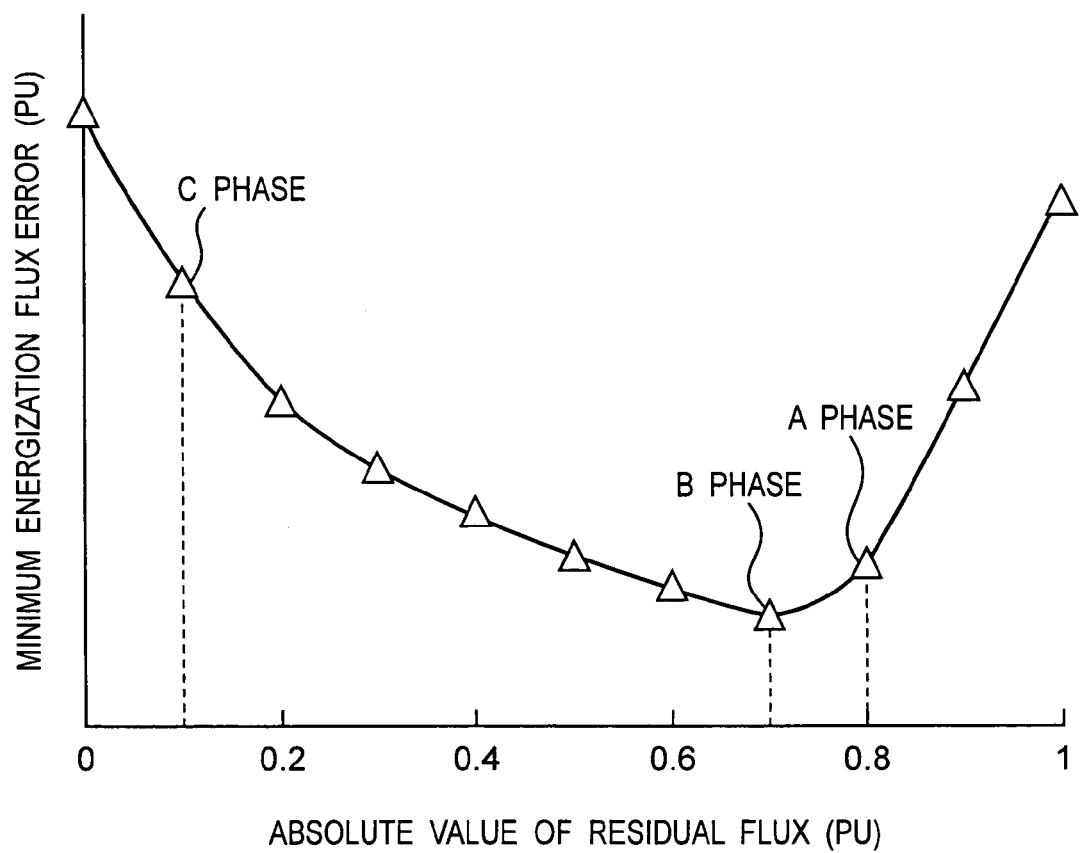
FIG. 6 is a drawing that explains a transformer inrush current elimination equipment in accordance with an embodiment 3 of the present invention.

An embodiment 3 of the present invention will be described below with reference to FIGS. 1 and 6. FIG. 6 is a characteristic drawing that shows a relationship between the minimum energization flux error and the respective residual fluxes in a transformer inrush current elimination system having the same construction as that shown in FIG. 1 of the embodiment 1. In FIG. 6, the unit of the axis of ordinates and the axis of abscissas is PU, and, in the same manner as the axis of ordinates in FIG. 3, the amplitude of the flux of the three-phase transformer 3 upon application of a normal voltage is standardized as 1PU.

In the embodiment 1, the closing order determining portion 8 determines the first closing phase among three-phases, by preparing the phase having the greatest absolute value of the residual flux 7 calculated by the residual flux calculating portion 6 as the first closing phase. Whereas, in the present embodiment 3, with respect to each phase, a closing phase that makes the energization flux error smallest and a minimum energization flux error are respectively calculated based upon the residual flux, the preliminary given pre-arc characteristic and closing time deviation characteristic of the three-phase circuit breaker 2, using the 0 degree phase of the standard phase as a reference point. The, among the three-phases, the phase that makes the minimum energization flux error smallest is set as the first closing phase. The other structures are the same as those explained in the embodiment 1, and therefore, the following description will mainly discuss points different from those in the embodiment 1.

The following description will discuss the closing order determining means 8.

As explained in the description of "(1) Concerning determination of the target closing phase and the target closing time of the first closing phase" in the embodiment 1, based upon the preliminary given pre-arc characteristic and closing time deviation characteristic of the three-phase circuit breaker 2, a closing phase that makes the energization flux error smallest and a minimum energization flux error can be respectively calculated with respect to each of the residual fluxes, for example, with respect to the absolute value (PU) of the residual flux being 0, 0.1, . . . 0.9, and 1. FIG. 6 shows the results of the calculations. As shown in FIG. 6, the energization flux error at the target closing time is not necessarily lowered as the absolute value of the residual flux increases. Here, the characteristics shown in FIG. 6 are not obtained in all the circuit breakers, but in particular, appear in circuit breakers having a small inclination of the dielectric withstand line.

For example, supposing that residual fluxes of the respective phases which are referred to as A phase, B phase and C phase are represented by (A phase, B phase, C phase)=(+0.8 PU, −0.7PU, −0.1PU), FIG. 6 shows that the minimum energization flux error calculated with respect to the residual flux of B phase is the smallest.

Therefore, in the closing order determining portion 8, with respect to each phase, a closing phase that makes the energization flux error smallest and a minimum energization flux error are respectively calculated based upon the residual flux, preliminary given pre-arc characteristic and closing time deviation characteristic of the three-phase circuit breaker 2, using the 0 degree phase of the standard phase as a reference point. Then, among the three-phases, the phase that makes the minimum energization flux error smallest is set as the first closing phase. In this manner, by setting the B phase that makes the minimum energization flux error smallest as the first closing phase, it becomes possible to surely make the energization flux error smallest. In other words, it becomes possible to positively suppress the maximum value of the inrush current of the first closing phase by taking the circuit breaker characteristics into consideration.

With respect to the first closing phase determined by the closing order determining portion 8, the target closing phase/time determining portion 10 determines a closing phase that makes smallest the energization flux error of the first closing phase calculated by the closing order determining portion 8 as the target closing phase of the first closing phase. Then, the time required from the reference point to the target closing phase of the first closing phase is set as the target closing time of the first closing phase.

Moreover, with respect to the rest two phases, by using the 0 degree phase of the standard phase as a reference point, based upon the preliminary given pre-arc characteristic and closing time deviation characteristic of the three-phase circuit breaker 2, a closing phase that makes the energization flux error smallest at the time of the residual flux being 0 is calculated to be set as the target closing phase of the rest two phases. Thus, the sum of the time required from the reference point to the target closing phase of the rest two phases and a delay time corresponding to an integral multiple of the predetermined cycle of the three-phase power supply is set as the target closing time of the rest two phases.

In the same manner as the embodiment 1, upon receipt of the closing command 12, the controlled closing portion 13 outputs a controlled closing signal 14 to the three-phase circuit breaker 2. Here, each phase is contact-closed at the target closing time of each of the phases that has been calculated by the target closing phase/time determining portion 10 by using the 0 degree phase of the source voltage 20 of the standard phase measured by the source voltage measuring means 4 as a reference point.

As described above, in the case of a circuit breaker having a small inclination of the dielectric withstand line of the circuit breaker, the energization flux error at the time of the target closing time is not necessarily lowered as the absolute value of the residual flux increases.

In the present embodiment, the closing order determining portion 8, by using 0 degree phase of the standard phase as a reference point, with respect to each of the phases, respectively calculates a closing phase that makes the energization flux error smallest and a minimum energization flux error, based upon the residual flux and the predetermined pre-arc characteristic and closing time deviation characteristic of the three-phase circuit breaker, and determines the phase having the smallest minimum energization flux error among the three-phases as the first closing phase. Therefore, it is possible to surely suppress the maximum value of the inrush current of the first closing phase. Therefore, it becomes possible to positively prevent generation of an excessive inrush current.

Embodiment 4

Figure 7:
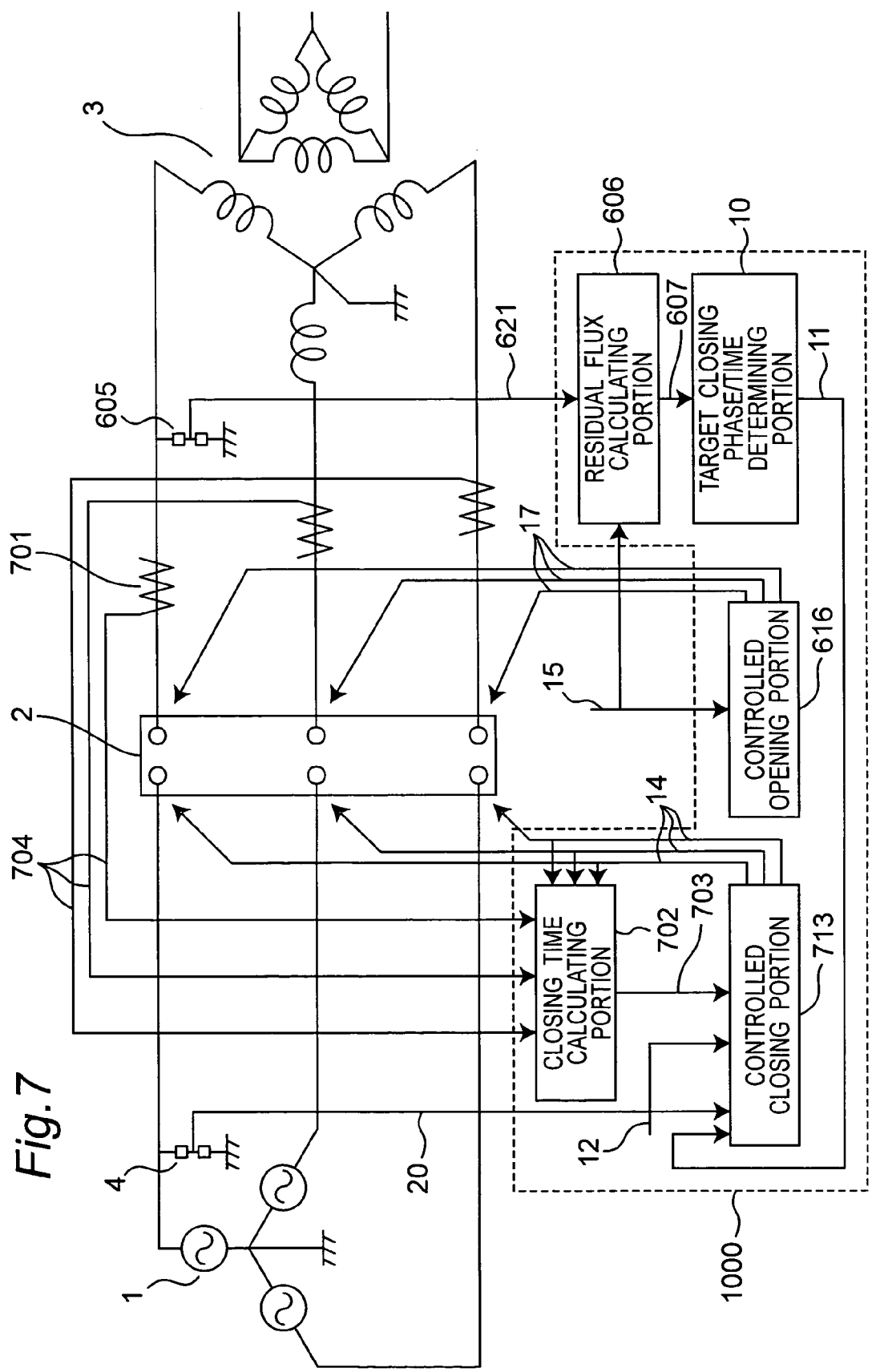
FIG. 7 is a drawing that explains a transformer inrush current elimination equipment in accordance with an embodiment 4 of the present invention.
Figure 8:
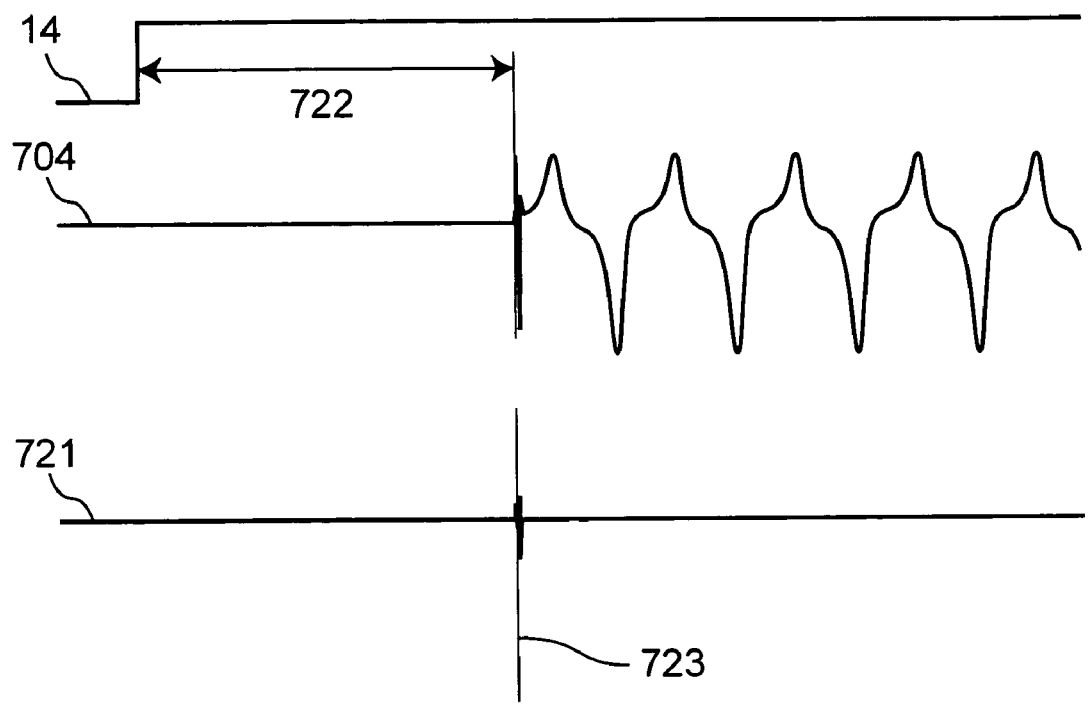
FIG. 8 is a drawing that explains the transformer inrush current elimination equipment in accordance with the embodiment 4 of the present invention.
Figure 9:
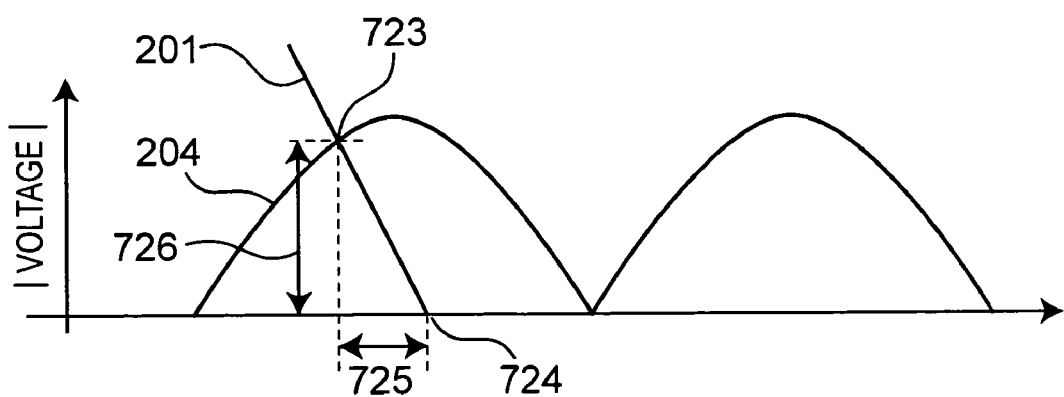
FIG. 9 is a drawing that explains the transformer inrush current elimination equipment in accordance with the embodiment 4 of the present invention.

A transformer inrush current elimination system in accordance with an embodiment 4 will be described below with reference to FIGS. 7 to 9. More specifically, FIG. 7 is a block diagram showing structures of main portions of the transformer inrush current elimination system including a three-phase transformer, a three-phase circuit breaker and a controller, and showing signals and data flows. FIG. 8 is a timing chart showing a relationship among a closing command signal, a main circuit current and a high-pass filtered signal. FIG. 9 is a graph showing phase characteristics for explaining a method of calculating an measured closing time from a measured making time.

The construction of the present embodiment 4 shown in FIG. 7 is similar to that of the embodiment 2 shown in FIG. 5, and different points reside in that a main circuit current measuring portion 701 and a closing time calculating portion 702 are added in the embodiment 4.

The main circuit current measuring portion 701 is provided to measure a main circuit current 704 of each of the phases. Here, as the main circuit current measuring portion 701, a potential transformer which is generally used in current measurements is adopted. The closing time calculating portion 702 is provided to calculate a measured closing time 703 required from a time of outputting the controlled closing signal 14 of each of the phases to a time of closing the contacts. More specifically, the closing time calculating portion 702 calculates the measured closing time 703, by using the controlled closing signal 14 of each of the phases that is outputted from the controlled closing portion 713, main circuit current 704 of each of the phases that is measured by the main circuit current measuring portion 701 and voltage resistant characteristics of each of the phases that has been preliminarily given. In the controlled closing portion 713, the controlled closing signal 14 is corrected based upon the measured closing time 703.

The other structures and operations are the same as those explained in the embodiment 2, and therefore, the following description will mainly discuss the points different from those in the embodiment 2.

In the present embodiment, the controller 1000 includes the closing time calculating portion 702 together with a residual flux calculating portion 606, a target closing phase/time determining portion 10, a controlled closing portion 713 and a controlled opening portion 616.

First, the following describes an operation of the closing time calculating portion 702.

FIG. 8 shows one example of a state of the main circuit current 704 at a making time. At the moment of the input, an electrical transient of a high-frequency surge is generated in the main circuit current 704. Therefore, a measuring process of the main circuit current 704 is started from the time point of outputting the controlled closing signal 14. Then, by extracting only a high-frequency band, a high-pass filtered signal 721 is obtained for emphasizing the input moment. Thus, a point at which the high-pass filtered signal 721 exceeds a predetermined threshold value is defined as an input point 723, and the time required from the point of outputting the controlled closing signal 14 to the input point 723 is defined as a measured making time 722.

Referring to FIG. 9, the following describes a method of calculating a measured closing time 703 based upon the measured making time 722. As shown in FIG. 9, since the characteristic 204 of the absolute value of an interpole voltage with respect to a making phase is preliminarily known, an input voltage 726 is obtained from the making phase at the input point '723. A pre-arc time 725 is calculated by dividing the input voltage 726 by an inclination of a dielectric withstand line 201 that has been preliminarily given. In this case, the closing point is obtained as shown by a point 724. The measured closing time 703 is given as a value obtained by adding the pre-arc time 725 and the measured making time 722.

With respect to the controlled closing portion 713, the following describes an operation of correcting the controlled closing signal (i.e., a compensation of a predicted closing time) based upon the measured closing time, which is a point different from the controlled closing portion 13 shown in FIG. 1 of the embodiment 1.

In the controlled closing portion 13 shown in FIG. 1 of the embodiment 1, upon receipt of the closing command 12, the control signal output delays $D_1$ (msec), $D_2$ (msec) and $D_3$ (msec) for the respective phases are calculated by using $T_1$ (msec), $T_2$ (msec), $T_3$ (msec) obtained by the target closing phase/time determining portion 10 and predicted next closing times $E_1$ (msec), $E_2$ (msec), $E_3$ (msec) in the first, second and third closing phases. Here, $E_1$, $E_2$ and $E_3$ are determined based upon the closing times of the respective phases of the three-phase circuit breaker 2, which have been preliminarily measured, or may be set by using the closing times that have been predicted after carrying out compensations based upon a control voltage, ambient temperature and operating pressure that are operation conditions for the three-phase circuit breaker 2.

In contrast, in the present embodiment 4, compensations, formed based upon the past operational hysteresis (hereinafter, referred to as "operation hysteresis compensation"), are newly carried out with respect to the predicted next closing times $E_1$, $E_2$ and $E_3$. For example, with respect to the measured closing time 703 and the predicted closing time prior to the operation hysteresis compensations, errors related to the past n-times (for example, past 10 times) are obtained, and the errors are subjected to a weighting process to obtain a compensation time $\Delta T$ based upon the past operation hysteresis. In other words, an error in the past i-numbered operation is multiplied by a weighting coefficient w(i), and the obtained values corresponding to the past n-times are added to obtain the compensation time $\Delta T$ as below.

$$\Delta T = \Sigma \{w(i) \times (Tacc\ (i) - Tpcc\ (i))\}$$

where i=1 to n, Tacc is actual closing time, Tpcc is predicted closing time prior to operational hysteresis compensations, and where the sum of the weighting coefficients w(i) is set to 1. With respect to the weighting coefficients, coefficient relating to the nearest data is preferably made greater in order to improve the response characteristic to variations in the closing time.

Each of the predict closing times $E_1$, $E_2$ and $E_3$ is set to a value obtained by adding the above-mentioned $\Delta T$ to the corresponding predict closing time Tpcc prior to the operational hysteresis compensations.

As described above, according to the present embodiment 4, the main circuit current measuring portion 701 is provided to measure the main circuit current 704 of each phase, and the closing time calculating portion 702 is provided to calculate the measured closing time 703 required from the time point of outputting the controlled closing signal 14 of each phase to the time point of closing the contacts, by using the controlled closing signal 14, the main circuit current 704 of each phase measured by the main circuit current measuring means 701 and preliminary given voltage resistant characteristics of each phase, and the controlled closing portion 713 corrects the controlled closing signal 14 based upon the measured closing time 703 so that each of the phases is correctly contact-closed at the corresponding target closing time. Thus, it becomes possible to positively suppress the inrush current.

Here, in FIG. 7, the present embodiment is applied to the transformer inrush current elimination system shown in the embodiment 2. However, the present embodiment may be applied to the transformer inrush current elimination system shown in the embodiment 1 or 3, and the same effects can be obtained.

As described above, according to the present invention, a transformer inrush current elimination system includes a residual flux calculating portion adapted to calculate a residual flux of each phase using the transformer voltage of each phase measured by the transformer voltage measuring means before and after a opening command input time. The system further includes a closing order determining portion adapted to determine a phase having the greatest absolute value of the residual flux calculated by the residual flux calculating portion, to be a first closing phase among the three-phases; a target closing phase determining portion adapted to determine target closing phases of the three closing phases.

In this construction, regarding the first closing phase, the target closing phase determining portion calculates a closing phase having the smallest value of an energization flux error that is an absolute value of the maximum error between a constant flux value and a residual flux value at a connection input point, based upon the residual flux of the first closing phase, and a preliminarily given pre-arc characteristic and closing time deviation characteristic of the three-phase circuit breaker, by using a 0 degree phase of the standard phase as a reference point, and sets the resultant calculated closing phase to be a target closing phase of the first closing phase. Regarding the rest two phases, the target closing phase determining portion calculates a closing phase having the smallest value of the energization flux error in the case of the residual flux being 0, based upon the preliminarily given pre-arc characteristic and closing time deviation characteristic of the three-phase circuit breaker, by using the 0 degree phase of the standard phase as a reference point, and sets the resultant calculated closing phase to be a target closing phase of each of the rest two phases.

The system further includes a target closing time determining portion adapted to calculate a time required from the reference point to the target closing phase of the first closing phase so that the calculated time is determined to be a target closing time of the first closing phase, and calculate a sum of the time required from the reference point to the target closing phases of the rest two phases and a delay time corresponding to an integral multiple of a predetermined cycle of the three-phase power supply so that the calculated sum is determined to be a target closing time of each of the rest two phases.

The system further includes a controlled closing portion which, upon receipt of a closing command, outputs a controlled closing signal to the three-phase circuit breaker so that each phase is contact-closed at the target closing time of each phase calculated by said target closing time determining portion, by using the 0 degree phase of the source voltage of the standard phase inputted from the source voltage measuring means as a reference point.

Therefore, it becomes possible to suppress the greatest value of an inrush current, and consequently to prevent the generation of an excessive inrush current.

According to a second aspect of the present invention, a transformer inrush current elimination system includes a controlled opening portion which, upon receipt of an opening command, simultaneously outputs controlled opening signals to the rest two phases other than the standard phase, and after a predetermined time lapse therefrom, which outputs a controlled opening signal to the standard phase.

The system further includes a residual flux calculating portion adapted to calculate a residual flux of the standard phase using the transformer voltage of the standard phase measured by the transformer voltage measuring means before and after a opening command input time.

The system further includes a target closing phase determining portion adapted to determine target closing phases of the three closing phases, wherein, regarding the standard phase, said target closing phase determining portion calculates a closing phase having the smallest value of an energization flux error that is an absolute value of the maximum error between a constant flux value and a residual flux value at a connection input point, based upon the residual flux of the standard phase, and a preliminarily given pre-arc characteristic and closing time deviation characteristic of the three-phase circuit breaker, by using a 0 degree phase of the standard phase as a reference point, and sets the resultant calculated closing phase to be a target closing phase of the standard phase, and wherein, regarding the rest two phases, the target closing phase determining portion calculates a closing phase having the smallest value of the energization flux error in the case of the residual flux being 0, based upon the preliminarily given pre-arc characteristic and closing time deviation characteristic of the three-phase circuit breaker, by using the 0 degree phase of the standard phase as a reference point, and sets the resultant calculated closing phase to be a target closing phase of each of the rest two phases.

The system further includes a target closing time determining portion adapted to calculate a time required from the reference point to the target closing phase of the standard phase so that the calculated time is determined to be a target closing time of the standard phase, and calculate a sum of the time required from the reference point to the target closing phases of the rest two phases and a delay time corresponding to an integral multiple of a predetermined cycle of the three-phase power supply so that the calculated sum is determined to be a target closing time of each of the rest two phases.

The system further includes a controlled closing portion which, upon receipt of a closing command, outputs a controlled closing signal to the three-phase circuit breaker so that each phase is contact-closed at the target closing time of each phase calculated by the target closing time determining portion, by using the 0 degree phase of the source voltage of the standard phase inputted from the source voltage measuring means as a reference point.

Therefore, it becomes possible to suppress the greatest value of an inrush current, and consequently to prevent the generation of an excessive inrush current. Moreover, it is possible to minimize a stress imposed on the three-phase transformer, and also to minimize a delay caused by the controlling process.

According to a third aspect of the present invention, a transformer inrush current elimination system includes a residual flux calculating portion adapted to calculate a residual flux of each phase using the transformer voltage of each phase measured by the transformer voltage measuring means before and after a opening command input time.

The system further includes a closing order determining portion adapted to determine a closing order of the three-phases, wherein, regarding each of the three-phases, the closing order determining portion calculates a minimum energization flux error and a closing phase having the smallest value of the energization flux error that is an absolute value of the maximum error between a constant flux value and a residual flux value at a connection input point, based upon the calculated residual flux, and a preliminarily given pre-arc characteristic and closing time deviation characteristic of the three-phase circuit breaker, by using a 0 degree phase of the standard phase as a reference point, and sets the resultant calculated closing phase having the smallest minimum energization flux error to be a first closing phase among the three-phases.

The system further includes a target closing phase determining portion adapted to determine target closing phases of the three-phases, wherein, regarding the first closing phase, the target closing phase determining portion calculates a closing phase having the smallest value of the energization flux error of the first closing phase calculated by the closing order determining portion, and sets the resultant calculated closing phase to be a target closing phase of the first closing phase, and wherein, regarding the rest two phases, the target closing phase determining portion calculates a closing phase having the smallest value of the energization flux error in the case of the residual flux being 0, based upon the preliminarily given pre-arc characteristic and closing time deviation characteristic of the three-phase circuit breaker, by using the 0 degree phase of the standard phase as a reference point, and sets the resultant calculated closing phase to be a target closing phase of each of the rest two phases.

The system further includes a target closing time determining portion adapted to calculate a time required from the reference point to the target closing phase of the first closing phase so that the calculated time is determined to be a target closing time of the first closing phase, and calculate a sum of the time required from the reference point to the target closing phases of the rest two phases and a delay time corresponding to an integral multiple of a predetermined cycle of the three-phase power supply so that the calculated sum value is determined to be a target closing time of each of the rest two phases.

The system further includes a controlled closing portion which, upon receipt of a closing command, outputs a controlled closing signal to the three-phase circuit breaker so that each phase is contact-closed at the target closing time of each phase calculated by said target closing time determining portion, by using the 0 degree phase of the source voltage of the standard phase inputted from the source voltage measuring means as a reference point.

Therefore, it becomes possible to suppress the greatest value of an inrush current, and consequently to prevent the generation of an excessive inrush current.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A transformer inrush current elimination system for suppressing an inrush current that is generated as a transition current when a three-phase transformer is connected to a three-phase power supply via a three-phase circuit breaker, comprising:
    source voltage measuring means for measuring a source voltage of one phase to be used as a standard phase among the three-phases of the three-phase power supply;
    transformer voltage measuring means for measuring a transformer voltage of each of the three-phases;
    a residual flux calculating portion for calculating a residual flux of each phase, using the transformer voltage of each phase measured by said transformer voltage measuring means, before and after a open command input time;

a closing order determining portion for determining which phase has the residual flux with largest magnitude, calculated by the residual flux calculating portion, as a first closing phase among the three-phases;

a target closing phase determining portion for determining target closing phases of the three phases, wherein, regarding the first closing phase, said target closing phase determining portion calculates a closing phase having smallest energization flux error, which is an absolute value of maximum error between a constant flux value and a residual flux value at a connection input point, based upon the residual flux of the first closing phase, and a preliminarily given pre-arc characteristic and closing time deviation characteristic of the three-phase circuit breaker, using a zero degree phase of the standard phase as a reference point, and sets the closing phase so calculated as the target closing phase of the first closing phase, and regarding second and third closing phases, said target closing phase determining portion calculates a closing phase having the smallest energization flux error when the residual flux is zero, based upon the preliminarily given pre-arc characteristic and closing time deviation characteristic of the three-phase circuit breaker, using the zero degree phase of the standard phase as a reference point, and sets the closing phase phases so calculated as target closing phases of each of the second and third closing phases;

a target closing time determining portion for calculating time required from the reference point to the target closing phase of the first closing phase so that the time calculated is determined to be a target closing time of the first closing phase, and for calculating a sum of the time required from the reference point to the target closing phases of the second and third closing phases and a delay time corresponding to an integer multiple of a predetermined cycle of the three-phase power supply so that the sum calculated is a target closing time of each of the second and third closing phases; and a controlled closing portion which, upon receipt of a closing command, outputs a controlled closing signal to the three-phase circuit breaker so that each phase is contact-closed at the target closing time of each phase calculated by said target closing time determining portion, using the zero degree phase of the source voltage of the standard phase input from the source voltage measuring means as a reference point, wherein said three-phase transformer has a primary winding having a star connection with a neutral ground and one of a secondary and tertiary winding having a triangle connection, and said three-phase circuit breaker connects the three-phase transformer to the three-phase power supply by closing and disconnects the transformer from the three-phase power supply by opening.

2. The transformer inrush current elimination system according to claim 1, further comprising:

main circuit current measuring means for measuring a main circuit current of each of the three-phases; and a closing time calculating portion for calculating a measured closing time required from outputting of a controlled closing signal of each phase to the closing, using a controlled closing signal of each phase output from the controlled closing portion, the main circuit current of each phase being measured by said main circuit current measuring means, and preliminarily given voltage resistant characteristics of each phase, wherein said controlled closing portion corrects the controlled closing signal based upon the closing time measured.

3. A transformer inrush current elimination system for suppressing an inrush current that is generated as a transition current when a three-phase transformer is connected to a three-phase power supply via a three-phase circuit breaker, comprising:

source voltage measuring means for measuring a source voltage of a first phase to be used as a standard phase among the three-phases of the three-phase power supply;

transformer voltage measuring means for measuring a transformer voltage of the standard phase;

a controlled opening portion which, upon receipt of a opening command, simultaneously outputs controlled opening signals to second and third phases of the three-phase power supply and, after a predetermined time lapse therefrom, outputs a controlled opening signal to the standard phase;

a residual flux calculating portion for calculating a residual flux of the standard phase using the transformer voltage of the standard phase measured by said transformer voltage measuring means, before and after an opening command input time;

a target closing phase determining portion for determining target closing phases of the three phases, wherein, regarding the standard phase, said target closing phase determining portion calculates a closing phase having smallest energization flux error, which is an absolute value of maximum error between a constant flux value and a residual flux value at a connection input point, based upon the residual flux of the standard phase, and a preliminarily given pre-arc characteristic and closing time deviation characteristic of the three-phase circuit breaker, using a zero degree phase of the standard phase as a reference point, and sets the closing phase so calculated as a target closing phase of the standard phase, and regarding the second and third phases, said target closing phase determining portion calculates a closing phase having the smallest energization flux error when the residual flux is zero, based upon the preliminarily given pre-arc characteristic and closing time deviation characteristic of the three-phase circuit breaker, using the zero degree phase of the standard phase as a reference point, and sets the closing phase so calculated as a target closing phase of each of the second and third phases;

a target closing time determining portion for calculating time required from the reference point to the target closing phase of the standard phase so that the time calculated is determined to be a target closing time of the standard phase, and for calculating a sum of the time required from the reference point to the target closing phases of the second and third phases and a delay time corresponding to an integer multiple of a predetermined cycle of the three-phase power supply so that the sum calculated is a target closing time of each of the second and third phases; and a controlled closing portion which, upon receipt of a closing command, outputs a controlled closing signal to the three-phase circuit breaker so that each phase is contact-closed at the target closing time of each phase calculated by said target closing time determining portion, using the zero degree phase of the source voltage of the standard phase input from the source voltage measuring means as a reference point, wherein said three-phase transformer has a primary winding having a star connection with a neutral ground and one of a secondary and tertiary winding having a triangle connection, and said three-phase circuit breaker connects the three-phase transformer to the three-phase power supply by closing and disconnects the transformer from the three-phase power supply by opening.

4. The transformer inrush current elimination system according to claim 3, further comprising:

main circuit current measuring means for measuring a main circuit current of each of the three-phases; and a closing time calculating portion for calculating a measured closing time required from outputting of a controlled closing signal of each phase to the closing, by using a controlled closing signal of each phase output from the controlled closing portion, the main circuit current of each phase being measured by said main circuit current measuring means, and preliminarily given voltage resistant characteristics of each phase, wherein said controlled closing portion corrects the controlled closing signal based upon the closing time measured.

5. A transformer inrush current elimination system for suppressing an inrush current that is generated as a transition current when a three-phase transformer is connected to a three-phase power supply via a three-phase circuit breaker, comprising:

source voltage measuring means for measuring a source voltage of a first phase to be used as a standard phase among the three-phases of the three-phase power supply;

transformer voltage measuring means for measuring a transformer voltage of each of the three-phases;

a residual flux calculating portion for calculating a residual flux of each phase, using the transformer voltage of each phase measured by said transformer voltage measuring means, before and after an opening command input time;

a closing order determining portion for determining a closing order of the three-phases, wherein, regarding each of the three-phases, said closing order determining portion calculates a minimum energization flux error and a closing phase having the smallest value of the energization flux error, which is an absolute value of the maximum error between a constant flux value and a residual flux value at a connection input point, based upon the residual flux calculated, and a preliminarily given pre-arc characteristic and closing time deviation characteristic of the three-phase circuit breaker, using a zero degree phase of the standard phase as a reference point, and sets the closing phase having the smallest minimum energization flux error to be a first closing phase among the three-phases;

a target closing phase determining portion for determining target closing phases of the three-phases, wherein, regarding the first closing phase, said target closing phase determining portion calculates a closing phase having the smallest value of the energization flux error of the first closing phase, calculated by said closing order determining portion, and sets the closing phase so calculated as a target closing phase of the first closing phase, and regarding the second and third closing phases, said target closing phase determining portion calculates a closing phase having the smallest value of the energization flux error when the residual flux is zero, based upon the preliminarily given pre-arc characteristic and closing time deviation characteristic of the three-phase circuit breaker, using the zero degree phase of the standard phase as a reference point, and sets the closing phase so calculated as a target closing phase of each of second and third phases of the three-phase power supply;

a target closing time determining portion for calculating time required from the reference point to the target closing phase of the first closing phase so that the time calculated is determined to be a target closing time of the first closing phase, and for calculating a sum of the time required from the reference point to the target closing phases of the second and third phases and a delay time corresponding to an integer multiple of a predetermined cycle of the three-phase power supply so that the sum calculated is determined to be a target closing time of each of the second and third phases; and a controlled closing portion which, upon receipt of a closing command, outputs a controlled closing signal to the three-phase circuit breaker so that each phase is contact-closed at the target closing time of each phase calculated by said target closing time determining portion, using the zero degree phase of the source voltage of the standard phase input from the source voltage measuring means as a reference point, wherein said three-phase transformer has a primary winding having a star connection with a neutral ground and one of a secondary and tertiary winding having a triangle connection, and said three-phase circuit breaker connects the three-phase transformer to the three-phase power supply by closing and disconnects the transformer from the three-phase power supply by opening.

6. The transformer inrush current elimination system according to claim 5, further comprising:

main circuit current measuring means for measuring a main circuit current of each of the three-phases; and a closing time calculating portion for calculating a measured closing time required from outputting of a controlled closing signal of each phase to the closing, using a controlled closing signal of each phase output from the controlled closing portion, the main circuit current of each phase being measured by said main circuit current measuring means, and preliminarily given voltage resistant characteristics of each phase, wherein said controlled closing portion corrects the controlled closing signal based upon the closing time measured.

* * * * *